United States Patent
Alam et al.

(10) Patent No.: US 12,542,505 B2
(45) Date of Patent: Feb. 3, 2026

(54) SYSTEMS AND METHODS FOR BI-DIRECTIONAL ONBOARD BATTERY CHARGING FUNCTIONS IN SEPARATELY EXCITED MOTOR DRIVES

(71) Applicant: GM GLOBAL TECHNOLOGY OPERATIONS LLC, Detroit, MI (US)

(72) Inventors: Khorshed Mohammed Alam, Canton, MI (US); Yilun Luo, Ann Arbor, MI (US); Junghoon Kim, Springboro, OH (US); Chandra S. Namuduri, Troy, MI (US); Muhammad A. Zahid, Troy, MI (US); Mazharul Chowdhury, Canton, MI (US); Lei Hao, Troy, MI (US); Seyedrasoul Hosseini, Troy, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 331 days.

(21) Appl. No.: 18/479,414

(22) Filed: Oct. 2, 2023

(65) Prior Publication Data
US 2025/0112577 A1    Apr. 3, 2025

(51) Int. Cl.
| | |
|---|---|
| H01M 10/44 | (2006.01) |
| B60L 53/20 | (2019.01) |
| H01R 39/08 | (2006.01) |
| H02J 7/00 | (2006.01) |
| H02K 11/33 | (2016.01) |
| H02K 15/00 | (2006.01) |

(Continued)

(52) U.S. Cl.
CPC .............. *H02P 27/06* (2013.01); *B60L 53/20* (2019.02); *H01R 39/08* (2013.01); *H02J 7/0013* (2013.01);

(Continued)

(58) Field of Classification Search
CPC ......... H02P 27/06; H02K 11/33; B60L 50/60; H01M 10/441
See application file for complete search history.

(56) References Cited

U.S. PATENT DOCUMENTS

| | | |
|---|---|---|
| 6,031,965 A | 2/2000 | Hammer |
| 7,956,558 B2 | 6/2011 | Cull |

(Continued)

FOREIGN PATENT DOCUMENTS

| | | |
|---|---|---|
| DE | 69919065 T2 | 7/2005 |
| DE | 102016209627 A1 | 12/2016 |

(Continued)

*Primary Examiner* — Cortez M Cook
(74) *Attorney, Agent, or Firm* — Quinn IP Law (57) ABSTRACT

Presented are separately excited motor (SEM) drive systems, methods for making/using such systems, and vehicles equipped with such systems. A motor drive system includes a rechargeable battery unit and a multilevel power factor correction (PFC) device interposed between and electrically connecting the battery unit and an electric power source. The battery unit and PFC device are electrically connected via a traction inverter module (TIM) device and a multilevel power transfer circuit (PTC) device. The TIM contains multiple pairs of TIM switches, and the PTC device contains multiple PTC switches. An SEM unit contains a rotor assembly, which includes a rotor core bearing a rotor winding, and a stator assembly, which includes a stator core bearing multiple stator windings electromagnetically paired with the rotor winding. Each stator winding is electrically connected to a respective pair of TIM switches, whereas the rotor winding is electrically connected to the PTC switches.

20 Claims, 5 Drawing Sheets

(51) Int. Cl.
*H02P 27/06* (2006.01)
*B60L 50/60* (2019.01)
*H02K 11/00* (2016.01)
*H02M 1/42* (2007.01)

(52) U.S. Cl.
CPC ............ *H02K 11/33* (2016.01); *H02K 15/00* (2013.01); *B60L 50/60* (2019.02); *B60L 2210/40* (2013.01); *H02K 11/0094* (2013.01); *H02M 1/4208* (2013.01)

(56) References Cited

U.S. PATENT DOCUMENTS

| | | | |
|---|---|---|---|
| 9,126,581 B2 | 9/2015 | Swales | |
| 9,707,956 B2 | 7/2017 | Swales | |
| 10,369,900 B1 | 8/2019 | Conlon | |
| 10,596,917 B2 | 3/2020 | Conlon | |
| 10,665,398 B1 | 5/2020 | Namuduri | |
| 11,071,225 B2 | 7/2021 | Namuduri | |
| 11,171,571 B2 | 11/2021 | Prasad | |
| 11,349,470 B2 | 5/2022 | Namuduri | |
| 11,476,507 B2 | 10/2022 | Namuduri | |
| 11,511,632 B2 | 11/2022 | Heydel | |
| 2014/0091750 A1* | 4/2014 | Ikeda | H01M 10/441 320/104 |
| 2018/0115180 A1 | 4/2018 | Shin et al. | |
| 2021/0078442 A1 | 3/2021 | Prasad | |
| 2022/0388419 A1* | 12/2022 | Doi | B60L 53/16 |

FOREIGN PATENT DOCUMENTS

| | | |
|---|---|---|
| DE | 102017221696 A1 | 12/2018 |
| DE | 102019117701 A1 | 4/2020 |

* cited by examiner

SYSTEMS AND METHODS FOR BI-DIRECTIONAL ONBOARD BATTERY CHARGING FUNCTIONS IN SEPARATELY EXCITED MOTOR DRIVES

INTRODUCTION

The present disclosure relates generally to electrical systems for charging batteries. More specifically, aspects of this disclosure relate to onboard, high-voltage electrical systems for recharging batteries of separately excited motor (SEM) drives.

Current production motor vehicles, such as the modern-day automobile, are originally equipped with a powertrain that operates to propel the vehicle and power the vehicle's onboard electronics. In automotive applications, for example, the vehicle powertrain is generally typified by a prime mover that delivers driving torque through an automatic or manually shifted power transmission to the vehicle's final drive system (e.g., differential, axle shafts, corner modules, road wheels, etc.). Automobiles have historically been powered by a reciprocating-piston type internal combustion engine (ICE) assembly due to its ready availability, relative light weight, and overall efficiency. Such engines include compression-ignited (CI) diesel engines, spark-ignited (SI) gasoline engines, two, four, and six-stroke architectures, and rotary engines, as some non-limiting examples. Hybrid-electric and full-electric vehicles (collectively "electric-drive vehicles"), on the other hand, utilize alternative power sources to propel the vehicle and, thus, minimize or eliminate reliance on a fossil-fuel based engine for tractive power.

A full-electric vehicle (FEV)—colloquially labeled an "electric car"—is a type of electric-drive vehicle configuration that altogether omits an internal combustion engine and attendant peripheral components from the powertrain system, relying instead on a rechargeable energy storage system (RESS) and a traction motor for vehicle propulsion. The engine assembly, fuel supply system, and exhaust system of an ICE-based vehicle are replaced with a single or multiple traction motors, rechargeable battery cells, and battery cooling and charging hardware in a battery-based FEV. Hybrid-electric vehicle (HEV) powertrains, in contrast, employ multiple sources of tractive power to propel the vehicle, most commonly operating an internal combustion engine assembly in conjunction with a battery-powered or fuel-cell-powered traction motor. Since hybrid-type, electric-drive vehicles are able to derive their power from sources other than the engine, HEV engines may be turned off, in whole or in part, while the vehicle is propelled by the electric motor(s).

SUMMARY

High-voltage (HV) electrical systems govern the transfer of electricity between the traction motors and the rechargeable battery cells that supply the requisite power for operating many hybrid-electric and full-electric powertrains. To provide the power capacity and energy density needed to propel a vehicle at desired speeds for desired ranges, contemporary traction battery packs group multiple battery cells (e.g., 8-16+ cells/stack) into individual battery modules (e.g., 10-40+ modules/pack) that are electrically interconnected with one another and mounted onto the vehicle chassis, e.g., by a battery pack housing or support tray. Located on a battery side of the HV electric system is a front-end DC-to-DC power converter that is electrically connected to the battery pack(s) in order to increase the level of voltage supplied to a main DC bus and a power inverter module (PIM). Arranged across the positive and negative terminals of the main DC bus is a high-frequency bulk capacitor that provides electrical stability and stores supplemental electrical energy. A dedicated Electronic Battery Control Module (EBCM), through collaborative operation with a Powertrain Control Module (PCM) and each motor's power electronics package, governs operation of the battery pack(s) and traction motor(s).

As hybrid and electric vehicles become more prevalent, infrastructure is being developed and deployed to make day-to-day use of such vehicles feasible and convenient. Electric vehicle supply equipment (EVSE) for recharging electric-drive vehicles comes in many form factors, including residential electric vehicle charging stations (EVCS) that are purchased and operated by a vehicle owner (e.g., installed in the owner's garage), publicly accessible EVCS offered by public utilities or private retailers (e.g., at municipal or commercial charging facilities), and advanced high-voltage, fast-charging stations used by manufacturers, dealers, and service stations. (e.g., OEM multi-coupler 360+ kW DCFC superchargers). Plug-in-type hybrid and electric vehicles, for instance, may be recharged by physically connecting a charging cable of the EVSE to a complementary charging port of the vehicle. By comparison, wireless AC charging systems utilize electromagnetic field (EMF) induction to provide vehicle charging capabilities without the need for charging cables and cable ports. In most countries, a standardized conductive charger coupler is used to connect the EVCS to the vehicle's HV electrical system. The plug-in vehicle is equipped with a standardized charger inlet port for electrically mating with the charger coupler and locking the coupler in place to prevent inadvertent or unwanted decoupling.

Presented herein are electrical systems for charging batteries of separately excited motor (SEM) drives, methods for manufacturing and methods for operating such systems, and vehicles equipped with such systems. By way of illustration, and not limitation, disclosed systems and methods employ a rechargeable battery pack to power a separately excited motor, a traction inverter module (TIM) for motor stator control, and a rotor-excitation power transfer circuit (PTC) for motor rotor control. Unlike permanent magnet (PM) motor constructions, a separately excited motor is generally typified by rotor-borne armature windings that electromagnetically mate with stator-borne field windings to convert electrical energy into mechanical energy. The SEM drive system operates in conjunction with a front-end, multilevel (2+, 3+, . . . N+) power-factor correction (PFC) converter to provide galvanically isolated high-voltage (HV) battery charging features with reduced cost and increased efficiency. The TIM and rotor-excitation PTC may each take on various multilevel (2+, 3+, . . . N+) form factors for scalability across different voltages (e.g., below and above 1 kV). Moreover, the PTC may take on a conductive power transfer configuration (e.g., brush-based designs) or a non-conductive power transfer configuration (e.g., inductive, capacitive, and harmonic-excited designs). Using this system architecture may help to eliminate the mass, cost, and packaging space requirements for the Onboard Charging Module (OBCM) for supporting alternating-current (AC) charging of a system battery from an AC power grid, enabling bi-direction power flow both to and from the grid.

Aspects of this disclosure are directed to SEM drive systems with TIM-based stator control and PTC-based rotor control with multilevel PFC for optimized HV battery charging and enhanced OBCM functionality for both automotive and non-automotive applications. In an example, an adjustable-speed motor drive system includes a multiphase separately excited motor that is powered by a battery unit, such as a battery pack or battery module that contains one or more rechargeable battery cells (e.g., prismatic, pouch, or cylindrical lithium-ion cells). A multilevel power factor correction device electrically connects to an offboard electric power source (e.g., EVCS and power utility grid); once connected, the PFC is interposed between the battery unit and the power source. A traction inverter module, which contains multiple TIM switches, is electrically connected to the battery unit and PFC device and electrically connects to either the battery unit or the PFC device. Likewise, a multilevel power transfer circuit, which contains multiple PTC switches, is electrically connected to the battery unit and PFC device and electrically connects to either the battery unit or the PFC device. The SEM unit contains a rotor assembly, which includes a rotor core bearing one or more rotor windings, adjacent a complementary stator assembly, which includes a stator core bearing multiple stator windings that electromagnetically pair with the rotor winding(s). Each stator winding is electrically connected to a respective pair of TIM switches, whereas each rotor winding is electrically connected to the PTC switches.

Additional aspects of this disclosure are directed to electric-drive vehicles with SEM-based powertrains and HV electrical systems for charging the vehicle's resident batteries. As used herein, the terms "vehicle" and "motor vehicle" may be used interchangeably and synonymously to reference any relevant vehicle platform, such as passenger vehicles (ICE, HEV, FEV, fuel cell, fully and partially autonomous, etc.), commercial vehicles, industrial vehicles, tracked vehicles, off-road and all-terrain vehicles, motorcycles, farm equipment, watercraft, aircraft, e-bikes, etc. For non-automotive applications, disclosed concepts may be implemented for any logically relevant use, including pumping equipment, machine tools, appliances, etc. While not per se limited, disclosed concepts may be particularly advantageous for use with three-phase, inverter-fed DC SEM and lithium-class (secondary) electric vehicle battery (EVB) cells.

In an example, a motor vehicle includes a vehicle body with a passenger compartment, multiple road wheels mounted to the vehicle body (e.g., via corner modules coupled to a unibody or body-on-frame chassis), and other standard original equipment. For electric-drive vehicle applications, the vehicle's electrified powertrain employs one or more electric SEMs, which operate alone (e.g., for FEV powertrains) or in conjunction with an internal combustion engine assembly (e.g., for HEV powertrains), to selectively drive one or more of the road wheels and thereby propel the vehicle. Each SEM is operatively connected to a resident RESS that includes a battery assembly, which may be in the nature of a chassis-mounted HV traction battery pack or array of HV battery modules.

Continuing with the preceding discussion, an onboard multilevel PFC device, which is electrically connected to the battery assembly, selectively electrically connects to an offboard electric power source and, once connected, is interposed between the vehicle battery assembly and the power source. An onboard TIM device, which contains multiple pairs of TIM switches, is electrically connected to the battery assembly and the PFC device. In the same vein, an onboard multilevel rotor PTC device, which contains multiple pairs of PTC switches, is electrically connected to the battery assembly, the TIM device, and the PFC device.

Each SEM unit is secured to the vehicle body and electrically connected, e.g., via the TIM and/or PTC, to the vehicle battery assembly. The SEM unit contains a rotor assembly, which includes a rotatable rotor core bearing one or more electromagnetic rotor windings, and a stator assembly, which includes a stationary stator core bearing multiple electromagnetic stator windings that electromagnetically pair with the rotor winding. Each stator winding is electrically connected to a respective pair of the TIM switches (and not to any of the PTC switches), whereas each rotor winding is electrically connected to the PTC switches (and not to any of the TIM switches).

Aspects of this disclosure are also directed to manufacturing workflow processes, computer-readable media, and control logic for making or for using any of the disclosed HV electrical systems, SEM drive systems, and/or motor vehicles. In an example, a method is presented for manufacturing a motor drive system. This representative method includes, in any order and in any combination with any of the above and below disclosed options and features: receiving a battery unit containing a rechargeable battery cell; connecting a multilevel PFC device to the battery unit, the PFC device being configured to electrically connect to the electric power source and interpose between the battery unit and the power source, the PFC device containing multiple PFC switches; connecting a traction inverter module device to the battery unit and the PFC device, the TIM device containing multiple pairs of TIM switches; connecting a multilevel power transfer circuit device to the battery unit and the PFC device, the PTC device containing multiple PTC switches; receiving a separately excited motor unit with a rotor assembly and a stator assembly, the rotor assembly including a rotor core bearing an electrically conductive rotor winding, and the stator assembly including a stator core bearing multiple electrically conductive stator windings that electromagnetically pair with the rotor winding; connecting each of the stator windings to a respective one of the pairs of TIM switches; and connecting the rotor winding to the PTC switches.

For any of the disclosed systems, methods, and vehicles, the TIM device may be electrically interposed between the SEM unit's stator assembly and either the battery unit or the PFC device. It may also be desirable that the TIM be characterized by a lack of a direct electric-current transmitting connection with the rotor assembly of the SEM unit. Similarly, the PTC device may be electrically interposed between the SEM unit's rotor assembly and either the battery unit or the PFC device. In this instance, it may also be desirable that the PTC device be characterized by a lack of a direct electric-current transmitting connection with the stator assembly of the SEM unit.

For any of the disclosed systems, methods, and vehicles, the PTC switches may include at least a first series of PTC switches electrically connected in parallel to a second series of PTC switches. In this instance, each series of PTC switches may include at least two PTC switches that are electrically connected in series to each other. An optional brush slip ring (BSR) assembly may be interposed between and electrically connect the PTC device and the SEM unit's electromagnetic rotor winding(s). The BSR assembly may include a first BSR that is electrically connected to the first series of PTC switches and a second BSR that is electrically connected to the second series of PTC switches. The PTC device may also include a first capacitor that is electrically connected to the first series of PTC switches and a second capacitor that is electrically connected to the second series of PTC switches.

For any of the disclosed systems, methods, and vehicles, the PFC device may include a first series of PFC switches that is electrically connected in parallel to a second series of PFC switches. In this instance, each series of PFC switches may include at least two PFC switches that are electrically connected in series to each other. The PFC device may also include a capacitor that is electrically connected in parallel to the first and second series of PFC switches. Moreover, the PFC device may also include a first capacitor that is electrically connected to the first series of PFC switches and a second capacitor that is electrically connected to the second series of PFC switches.

For any of the disclosed systems, methods, and vehicles, the TIM device may contain three pairs of serially connected solid-state TIM switches, and the stator assembly may hear three electromagnetic field windings. Each stator field winding may be electrically connected in series with a respective one of the pairs or solid-state TIM switches. As noted above, the battery unit may take on any logically relevant form factor, including a battery assembly, a battery pack, and/or a battery module, each of which may contain a single or multiple rechargeable battery cells.

The above summary does not represent every embodiment or every aspect of the present disclosure. Rather, the foregoing summary merely provides a synopsis of some of the novel concepts and features set forth herein. The above features and advantages, and other features and attendant advantages of this disclosure, will be readily apparent from the following Detailed Description of illustrated examples and representative modes for carrying out the disclosure when taken in connection with the accompanying drawings and appended claims. Moreover, this disclosure expressly includes any and all combinations and subcombinations of the elements and features presented above and below.

The present disclosure is amenable to various modifications and alternative forms, and some representative embodiments of the disclosure are shown by way of example in the drawings and will be described in detail herein. It should be understood, however, that the novel aspects of this disclosure are not limited to the particular forms illustrated in the above-enumerated drawings. Rather, this disclosure covers all modifications, equivalents, combinations, permutations, groupings, and alternatives falling within the scope of this disclosure as encompassed, for example, by the appended claims.

DETAILED DESCRIPTION

This disclosure is susceptible of embodiment in many different forms. Representative embodiments of the disclosure are shown in the drawings and will herein be described in detail with the understanding that these embodiments are provided as an exemplification of the disclosed principles, not limitations of the broad aspects of the disclosure. To that extent, elements and limitations that are described, for example, in the Abstract, Introduction, Summary, Description of the Drawings, and Detailed Description sections, but not explicitly set forth in the claims, should not be incorporated into the claims, singly or collectively, by implication, inference or otherwise. Moreover, recitation of "first", "second", "third", etc., in the specification or claims is not per se used to establish a serial or numerical limitation; unless specifically stated otherwise, these designations may be used for ease of reference to similar features in the specification and drawings and to demarcate between similar elements in the claims.

For purposes of this Detailed Description, unless specifically disclaimed: the singular includes the plural and vice versa; the words "and" and "or" shall be both conjunctive and disjunctive; the words "any" and "all" shall both mean "any and all"; and the words "including," "containing," "comprising," "having," and the like, shall each mean "including without limitation." Moreover, words of approximation, such as "about," "almost," "substantially," "generally," "approximately," and the like, may each be used herein to denote "at, near, or nearly at," or "within 0-5% of," or "within acceptable manufacturing tolerances," or any logical combination thereof, for example. Lastly, directional adjectives and adverbs, such as fore, aft, inboard, outboard, starboard, port, vertical, horizontal, upward, downward, front, back, left, right, etc., may be with respect to a motor vehicle, such as a forward driving direction of a motor vehicle when the vehicle is operatively oriented on a horizontal driving surface.

Figure 1:
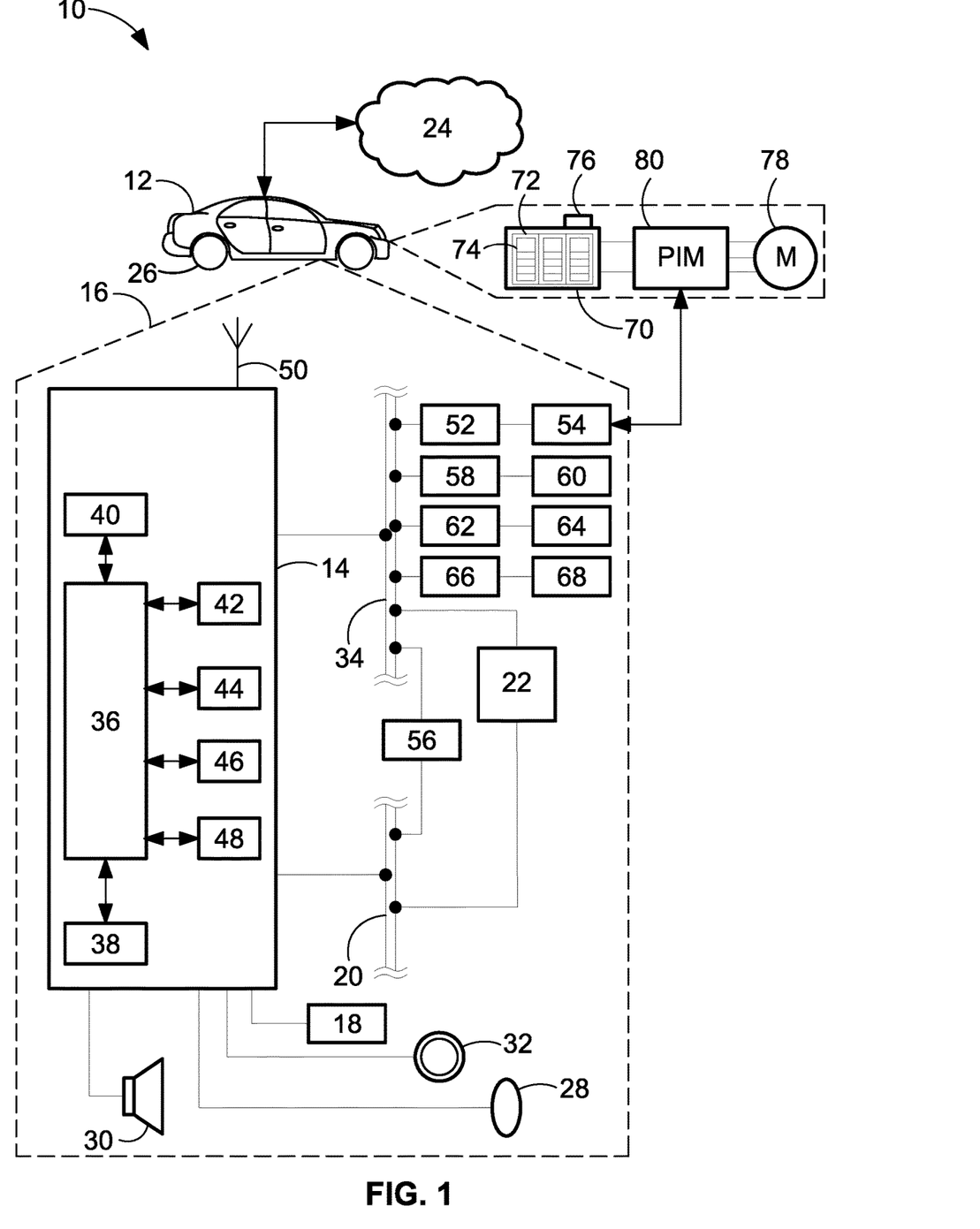
FIG. 1 is a partially schematic, side-view illustration of a representative motor vehicle with an SEM-based electrified powertrain, a rechargeable battery pack, and a high-voltage electrical system for smart charging of the battery pack cells in accord with aspects of the present disclosure.

Referring now to the drawings, wherein like reference numbers refer to like features throughout the several views, there is shown in FIG. 1 a representative motor vehicle, which is designated generally at 10 and portrayed herein for purposes of discussion as a sedan-style, electric-drive automobile. The illustrated automobile 10—also referred to herein as "motor vehicle" or "vehicle" for short—is merely an exemplary application with which aspects of this disclosure may be practiced. In the same vein, incorporation of the present concepts into an FEV powertrain powered by a single-pack RESS should be appreciated as a non-limiting implementation of disclosed features. As such, it will be understood that aspects and features of this disclosure may be applied to other powertrain systems and RESS architectures, incorporated into any logically relevant type of motor vehicle, and utilized for both automotive and non-automotive applications alike. Moreover, only select components of the motor vehicles, SEM drives, and HV electrical systems are shown and described in additional detail herein. Nevertheless, the vehicles, SEMs, and electrical systems discussed below may include numerous additional and alternative features, and other available peripheral components, for carrying out the various methods and functions of this disclosure.

The representative vehicle 10 of FIG. 1 is originally equipped with a centerstack telecommunications and information ("telematics") unit 14 that wirelessly communicates, e.g., via cell towers, satellite service, etc., with a remotely located cloud computing host service 24 (e.g., ONSTAR®). Other in-vehicle hardware components 16 shown in FIG. 1 include, as non-limiting examples, an electronic video display device 18, a microphone 28, audio speakers 30, and assorted user input controls 32 (e.g., buttons, knobs, switches, touchscreens, etc.). These hardware components 16 function as a human/machine interface (HMI) that enables a user to communicate with the telematics unit 14 and other components both resident to and remote from the vehicle 10. Microphone 28, for instance, provides occupants with means to input verbal commands. Conversely, the speakers 30 provide audible output to a vehicle occupant and may be either a stand-alone speaker dedicated for use with the telematics unit 14 or may be part of an audio system 22. The audio system 22 is operatively connected to a network connection interface 34 and an audio bus 20 to receive analog information, rendering it as sound, via one or more speaker components.

Communicatively coupled to the telematics unit 14 is the network connection interface 34, suitable examples of which include twisted pair/fiber optic Ethernet switches, parallel/serial communications buses, local area network (LAN) interfaces, controller area network (CAN) interfaces, and the like. Network connection interface 34 enables vehicle hardware 16 to send and receive signals with one another and with systems and subsystems both onboard and off-board the vehicle body 12. This allows the vehicle 10 to perform assorted vehicle functions, such as modulating powertrain output, activating a vehicle brake system, controlling vehicle steering, regulating charge and discharge of vehicle batteries, and other automated functions. For instance, telematics unit 14 may receive and transmit signals to/from a Powertrain Control Module (PCM) 52, an Onboard Charging Module (OBCM) 54, an Electronic Battery Control Module (EBCM) 56, a Steering Control Module (SCM) 58, a Brake System Control Module (BSCM) 60, and assorted other vehicle ECUs.

With continuing reference to FIG. 1, telematics unit 14 is an onboard computing device that provides a mixture of services, both individually and through its communication with other networked devices. This telematics unit 14 is generally composed of one or more processors 40, each of which may be embodied as a discrete microprocessor, an application specific integrated circuit (ASIC), or a dedicated control module. Vehicle 10 may offer centralized vehicle control via a central processing unit (CPU) 36 that is operatively coupled to an IC real-time clock (RTC) 42 and one or more electronic memory devices 38, each of which may take on the form of a CD-ROM, solid-state drive (SSD) memory, hard-disk drive (HDD) memory, semiconductor memory, etc.

Long-range communication (LRC) capabilities with off-board devices may be provided via a cellular communication component, a navigation and location component (e.g., global positioning system (GPS) transceiver), or a wireless modem, all of which are collectively represented at 44. Short-range communication (SRC) may be provided via a close-range wireless communication device 46 (e.g., a BLUETOOTH® unit), a dedicated short-range communications (DSRC) component 48, and/or a dual antenna 50. It should be understood that the vehicle 10 may be implemented without one or more of the above-listed components or, optionally, may include additional components and functionality as desired for a particular end use. The communications devices described above may provision data exchanges as part of a periodic broadcast in a vehicle-to-vehicle (V2V) communication system or a vehicle-to-everything (V2X) communication system.

CPU 36 receives sensor data from one or more sensing devices that use, for example, photo detection, radar, laser, ultrasonic, optical, infrared, or other suitable technology, including short range communications technologies (e.g., DSRC) or Ultra-Wide Band (UWB) radio technologies, e.g., for executing an automated vehicle operation or a vehicle navigation service. In accord with the illustrated example, the automobile 10 may be equipped with one or more digital cameras 62, one or more range sensors 64, one or more vehicle speed sensors 66, one or more vehicle dynamics sensors 68, and any requisite filtering, classification, fusion, and analysis hardware and software for processing raw sensor data. The type, placement, number, and interoperability of the distributed array of on-vehicle sensors may be adapted, singly or collectively, to a given vehicle platform for achieving a desired level of autonomous vehicle operation.

To propel the motor vehicle 10, an electrified powertrain is operable to generate and deliver tractive torque to one or more of the vehicle's drive wheels 26. The powertrain is represented in FIG. 1 by an electric traction motor 78 that is connected to a rechargeable energy storage system (RESS), which may be in the nature of a chassis-mounted traction battery pack 70. The battery pack 70 may contain one or more battery modules 72 each housing a group of electrochemical battery cells 74, such as lithium-ion or lithium-polymer battery cells of the pouch, can, or prismatic type. One or more electric machines, such as an adjustable-speed, multiphase SEM motor/generator (M) unit 78, draw electrical power from and, optionally, deliver electrical power to one or more rechargeable battery units, such as traction battery pack 70. An HV electrical system with a power inverter 80 electrically connects the battery pack 70 to the motor/generator unit(s) 78 and modulates the transfer of electrical current therebetween. The battery pack 70 may be configured such that module management, cell sensing, and module-to-host communications functionality is integrated directly into each module 72 and performed wirelessly via a wireless-enabled cell monitoring unit (CMU) 76.

Discussed below are separately excited motor (SEM) drive systems and methods using a stator-side power inverter for SEM stator control and a rotor-side excitation circuit for SEM rotor control. A multilevel front-end power factor correction (PFC) converter selectively connects the SEM drive circuit to the power grid to provide galvanically isolated HV battery charging with reduced cost and increased efficiency. The power inverter and rotor excitation circuit can each take on various multilevel (2+, 3+, . . . N+) form factors, e.g., for scalability across different voltages (e.g., above and below 1 kilovolt (kV)). Moreover, the PTC can take on a conductive power transfer configuration (e.g., brush-based designs) or a non-conductive power transfer configuration (e.g., inductive, capacitive, and asymmetric designs). The TIM may also take on different form factors, including 3-phase, 2-level inverters, 3-level neutral point clamped (NPC) inverters, 3-level T-type inverters, 3-level flying capacitors inverters, etc. Using this system architecture may help to minimize the mass, cost, and packaging space requirements for the Onboard Charging Module for supporting AC-fed fast charging of the battery from the power grid while also enabling bi-direction power flow to and from the grid.

Aspects of disclosed concepts are directed to a smart-integrated AC charging system that uses an active front-end PFC in conjunction with a separately excited motor drive. Galvanic isolation may be achieved through the motor's rotor and stator cores with power transfer through the magnetic coupling of the SEM's rotor-borne and stator-borne electromagnetic coils. A dedicated control scheme may be incorporated into the inverter controller for a DC-DC operating mode that delivers charging power to the battery with minimal losses. A mechanical disconnect may be employed to isolate the SEM's motor shaft during battery charging operations, e.g., to enable optimum speed control of the SEM and thereby maximize power transfer and efficiency. A multilevel, interleaved or non-interleaved front-end PFC stage (e.g., rated to at least 20 kW) may be employed to provide a suitable intermediate HV DC feed to a segmented-winding motor and a dual-inverter-based DC-DC converter.

In some non-limiting examples, the multilevel power inverter may be configured as any one or more of diode-clamped, active-clamped, T-type, flying-capacitor, or cascaded H-bridge type power inverter topologies. The switches of any of the herein described TIM, PFC and PTC configurations may be embodied as electro-mechanical contactors or, in an optional embodiment, as solid-state switches, such as IGBTs, MOSFETs, or other switchable semiconductor-based components. By way of non-limiting example, the inverter, power-factor, and rotor-excitation stages may use any or a combination of Si IGBTs+Anti-Parallel diodes, SiC MOSFETs, SiC Schottky diodes, GaN FETs, Ga2O3 switches/diodes, Diamond-based power devices, etc. Isolated DC-DC power conversion can be realized using 3-phase dual active bridge operation in conjunction with multi-stage/multi-level conversion circuitry to interface appropriate RESS voltages (e.g., 150 V to 1 kV and above).

Figure 2:
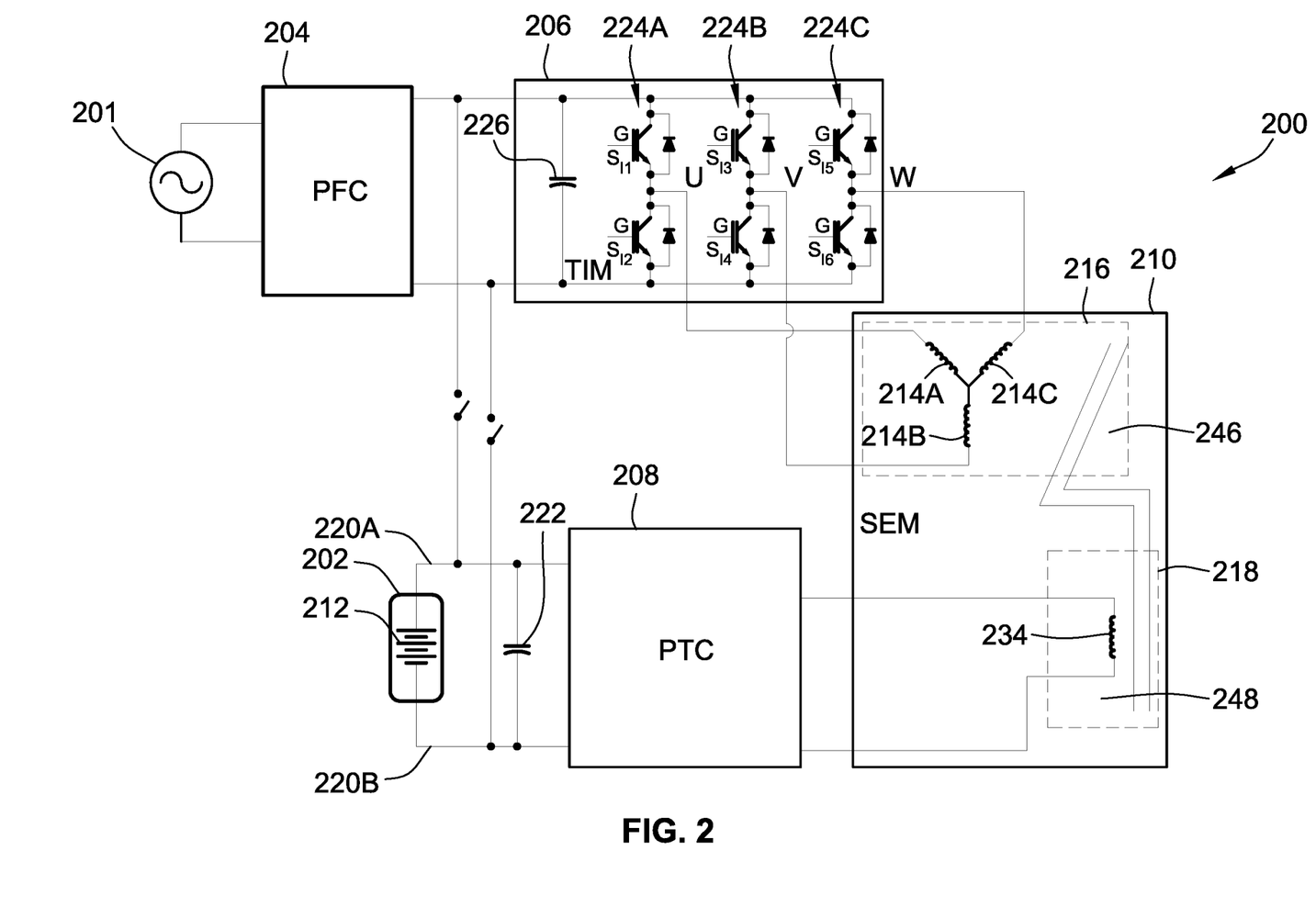
FIG. 2 is a schematic one-line diagram illustrating a representative SEM drive system with a front-end PFC converter connecting a stator-side of the circuit to an offboard electric power source in accord with aspects of the present disclosure.
Figure 3:
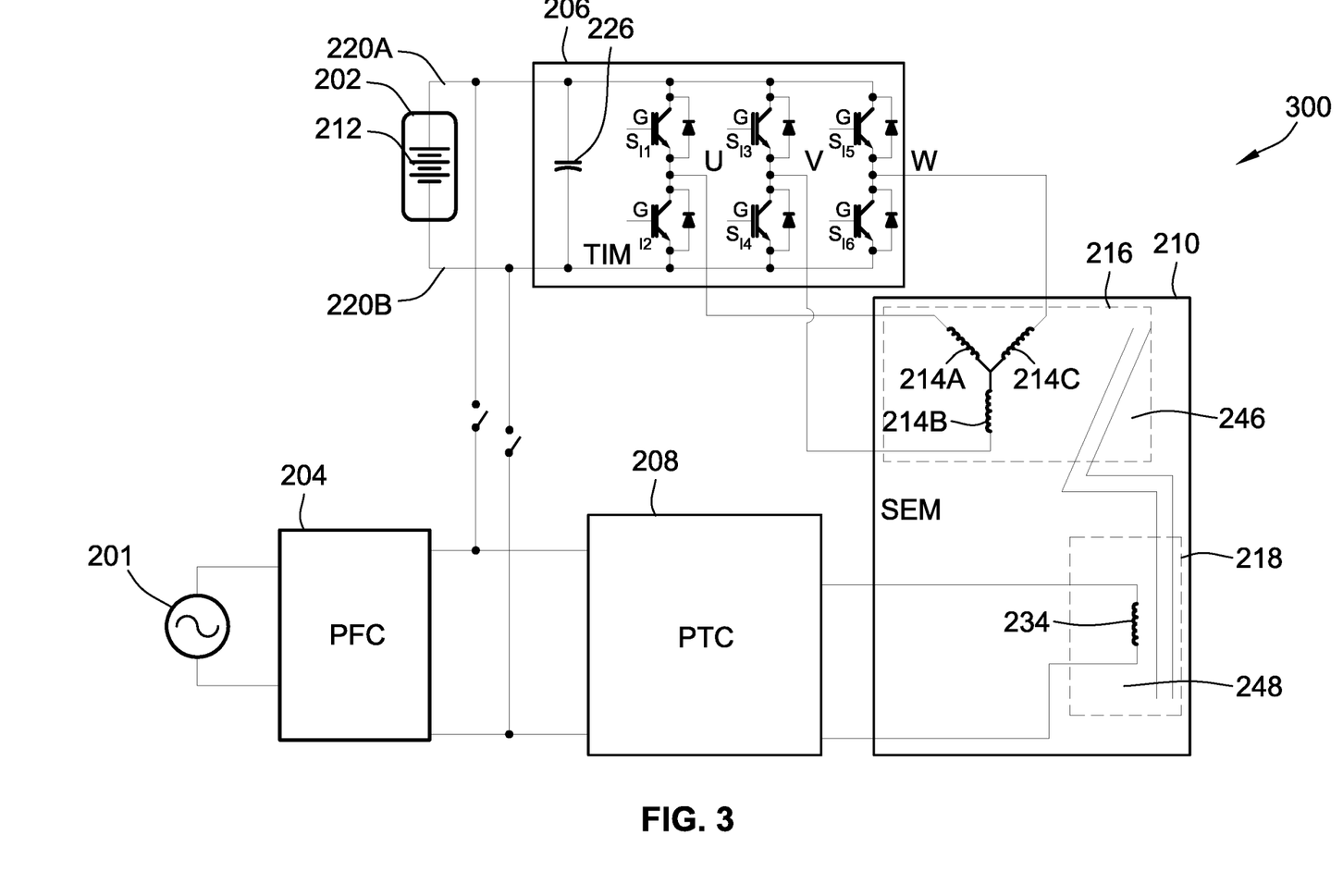
FIG. 3 is a schematic one-line diagram illustrating a representative SEM drive system with a front-end PFC converter connecting a rotor-side of the circuit to an offboard electric power source in accord with aspects of the present disclosure.

Turning next to FIGS. 2 and 3, wherein like reference numbers are used to designate the same or similar components throughout these views, there are shown two non-limiting examples of SEM drive systems, respectively designated at 200 and 300, that are adapted for electrically connecting and disconnecting a high-voltage electric power source, such as an AC power utility grid 201, to a battery unit, such as rechargeable battery assembly 202. Although differing in appearance, it is envisioned that any of the features and options described above with reference to the FEV powertrain (e.g., electric traction motor 78) and vehicle RESS (e.g., traction battery pack 70) of FIG. 1 may be incorporated, singly or in any combination, into the SEM drive systems 200 and/or 300 of FIGS. 2 and 3, and vice versa. Both of the SEM drive systems 200 and 300, for example, may be generally typified by a rechargeable battery unit/assembly 202, a power factor correction (PFC) device 204, a traction inverter module (TIM) device 206, a power transfer circuit (PTC) device 208, and a separately excited motor (SEM) unit 210.

The rechargeable battery assembly 202 may take on any of the herein described battery options, including one or more battery packs or one or more battery modules that each contains one or more rechargeable battery cells 212 (e.g., prismatic, pouch, or cylindrical lithium-ion cells). Moreover, each battery assembly may contain a set of solid-state relay contactors/switches (not shown) that are independently responsive to signals from a suitable controller/control module to govern the electrical output of the battery system. While only one battery assembly 202 and one motor 210 are shown in FIGS. 2 and 3 for illustrative simplicity, the SEM drive systems 200, 300 may include any number of battery units, motor units, and associated electrical hardware without departing from the intended scope of this disclosure.

A DC-to-AC and AC-to-DC power inverter 206, which may be part of a traction inverter module (TIM), connects via polyphase windings 214A, 214B and 214C to SEM unit 210 to transmit electrical energy between the SEM 210 and battery assembly 202. In FIG. 2, the TIM device 206 (also referred to herein as "inverter stage" or "inverter subcircuit") is directly electrically connected to and interposed between the PFC device 204 and the SEM unit 210. The TIM device 206 of FIG. 3, in contrast, is directly electrically connected to and interposed between the battery unit 202 and the SEM unit 210. In both of the illustrated examples, the TIM device 206 lacks a direct electrical connection to the rotor assembly 218 of the SEM unit 210. A direct-current battery output voltage is delivered from the battery 202 to the TIM 206 and PTC 208 across positive and negative voltage bus rails 220A and 220B, respectively, with an optional fixed-type DC bus capacitor 222 (FIG. 2) placed across the rails 220A, 220B.

Representative power inverter topologies may incorporate multiple inverters and respective motor control modules operable to receive motor control commands and control inverter states therefrom for providing motor drive or regenerative functionality. The TIM device 206 of FIGS. 2 and 3 may contain a one or more pairs of serially connected electromechanical or semiconductor switches (also referred to herein as "TIM switches") that cooperatively convert direct current (DC) power from one or more energy storage devices (e.g., battery assembly 202) to alternating current (AC) voltage for powering one or more electric machines (e.g., SEM unit 210) via high-frequency switching. In accord with the illustrated examples, the TIM device 206 contains six semiconductor switches $S_{11}$, $S_{12}$, $S_{13}$, $S_{14}$, $S_{15}$, and $S_{16}$ that are arranged in three pairs 224A, 224B and 224C of serially connected solid-state TIM switches. These three switch pairs 224A, 224B and 224C may be electrically connected in parallel with each other. Each switch $S_{11}$-$S_{16}$ may be embodied as a voltage-controlled bipolar switching device in the form of insulated gate bipolar transistor (IGBT), metal-oxide semiconductor field effect transistor (MOSFET), wideband GaN device (WBG), or other suitable switch having a corresponding gate to which a gate signal is applied to change the on/off state of a given switch.

Each pair of solid-state TIM switches 224A, 224B and 224C may be electrically connected in series to a respective one of the stator-borne field windings 214A, 214B, 214C of an SEM stator assembly 216. Power inverters, such as the TIM device 206 of FIGS. 2 and 3, use rapid controller-automated switching control techniques, e.g., pulse-width modulation (PWM) signals, to invert DC power supplied during discharge of the battery unit 202 into AC power suitable for driving the SEM unit 210. A pre-charge circuit (not shown) may be used to charge a DC link capacitor 226 within the TIM device 206 at a controlled rate so as to equalize a voltage across the various pairs of switches 224A-224C prior to closing contactors/switches within the battery unit 202.

With continuing reference to FIGS. 2 and 3, a multilevel PFC device 204 selectively electrically connects to the electric power source 201 and, once connected, is interposed between the power source 201 and the remainder of the SEM drive system 200, 300 (i.e., the battery unit 202, TIM 206, PTC 208 and SEM 210). This PFC device 204 (also referred to as a "PFC stage" or "PFC converter") provides power factor correction through shaping of the input current, e.g., to meet electric current harmonic limits of the system 200, 300. In FIG. 2, the PFC device 204 is directly electrically connected to and interposed between the power source 201 and the TIM device 204. The PFC device 204 of FIG. 3, in contrast, is directly electrically connected to and interposed between the power source 201 and the PTC device 208. In both of the illustrated examples, the PFC device 204 is located on either the stator-side circuit or the rotor-side circuit of the SEM drive systems 200, 300, whichever side is opposite that of the battery unit 202.

Figure 6:
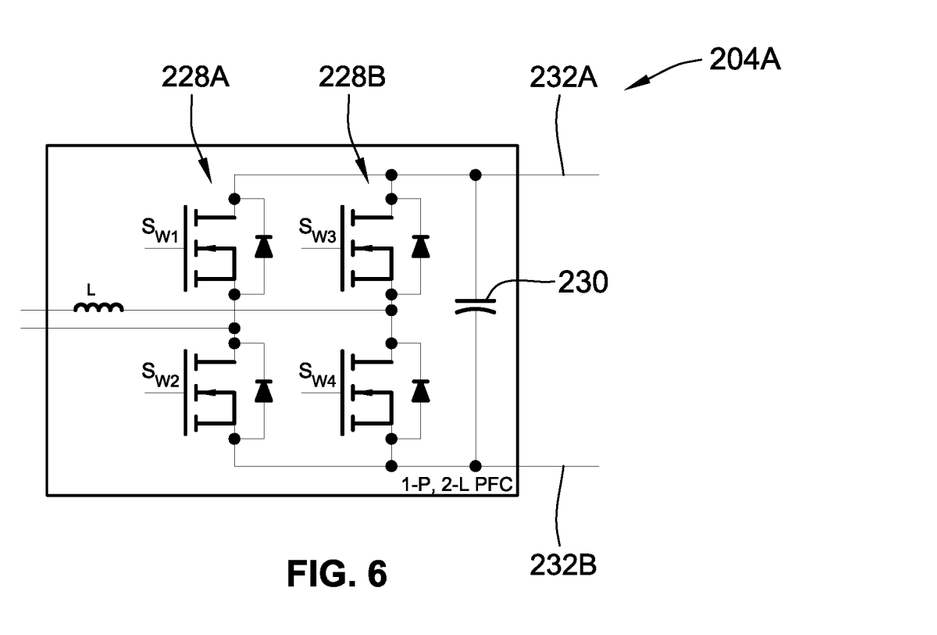
FIG. 6 is a schematic one-line diagram illustrating a representative single-phase, 2-level PFC converter in accord with aspects of the present disclosure.
Figure 7:
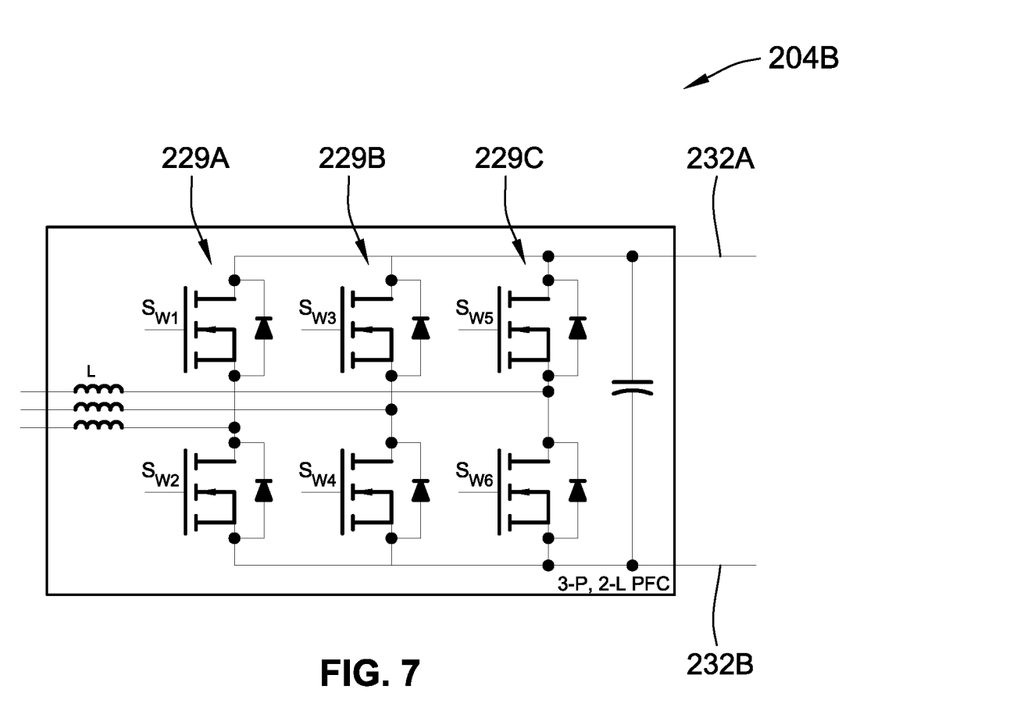
FIG. 7 is a schematic one-line diagram illustrating a representative 3-phase, 2-level PFC converter in accord with aspects of the present disclosure.

A PFC subcircuit may take on a variety of different topologies, including single-phase and multiphase PFC constructs, multilevel (2-level, 3-level . . . N-level) PFC constructs, active and hybrid switching PFC constructs, etc. FIGS. 6 and 7 respectively illustrate two non-limiting examples of PFC devices—a single-phase, 2-level PFC converter 204A and a 3-phase, 2-level PFC converter 204B—that may be incorporated into the SEM drive systems 200, 300 of FIGS. 2 and 3. A multiphase PFC may be apropos for applications such as that shown in FIG. 2 in which the PFC is located on the stator-side of the SEM in-line with the motor's polyphase windings. Comparatively, a single-phase PFC may be apropos for applications such as that shown in FIG. 3 in which the PFC is located on the rotor-side of the SEM in-line with the motor's DC armature windings.

The PFC devices 204A and 204B of FIGS. 6 and 7 may contain one or more pairs of serially connected electromechanical or semiconductor switches (also referred to herein as "PFC switches") that cooperatively increase a power factor of the current drawn by the SEM drive system 200, 300, e.g., to improve distribution efficiency when recharging the battery unit 202. In accord with the illustrated examples, the PFC device 204A of FIG. 6 contains four semiconductor switches $S_{W1}$, $S_{W2}$, $S_{W3}$, and $S_{W4}$ that are arranged in two pairs 228A and 228B of serially connected solid-state switches. These two switch pairs 228A-228B may be electrically connected in parallel with each other via PFC transfer rails 232A and 232B. In FIG. 6, a first switch pair 228A may electrically connect to a positive induction coil terminal of a rotor-borne armature winding 234, whereas the second switch pair 228B may electrically connect to a negative induction coil terminal of the armature winding 234. In contrast, the PFC device 204B of FIG. 7 contains six semiconductor switches $S_{W1}$-$S_{W6}$ that are arranged in three pairs 229A, 229B and 229C of serially connected solid-state switches. These three switch pairs 229A-229C may be electrically connected in parallel with each other via the PFC transfer rails 232A, 232B. In FIG. 7, each switch pair 229A-229C may be electrically connected in series to a respective one of the stator-borne field windings 214A, 214B, 214C.

A boost capacitor 230 may be arranged across positive and negative transfer rails 232A and 232B, respectively, of the PFC device 204A, 204B and thereby electrically connect in parallel with the multiple pairs of serially connected switches. These transfer rails 232A, 232B also electrically connect the switch pairs 228A-228B and 229A-229C of the PFC device 204A, 204B to the electric power source 201. For 3-level PFC configurations—including single-phase and multiphase designs—each pair of serially connected switches may be expanded to include four switches (e.g., for a total of eight switches in a single-phase PFC or twelve switches in a multiphase PFC). In addition, a respective block capacitor (not shown) may be arranged across the circuit line connecting the four switches in each set of serially connected switches.

For both SEM drive systems 200, 300, a multilevel PTC device 208 (also referred to as a "PTC stage" or "rotor excitation circuit") is electrically connected on an output-side thereof to the rotor-side of the SEM unit 210 and on an input-side thereof to both the battery unit 202 and the PFC device 204. The PTC device 208 of FIGS. 2 and 3 may provide single-phase rotor excitation functionality for the SEM's rotor assembly 218, e.g., for optimized motor control and system charging. In FIG. 2, the PTC device 208 is directly electrically connected to and interposed between the battery unit 202 and the SEM rotor assembly 218. The PTC device 208 of FIG. 3, in contrast, is directly electrically connected to and interposed between the PFC device 204 and the rotor assembly 218. In both of the illustrated examples, the PTC device 208 lacks a direct electrical connection to the stator assembly 216 of the SEM unit 210. While not per se limited, disclosed motor drive architectures may benefit from using an asymmetric bridge drive circuit to drive the rotor power transfer circuit.

Figure 4:
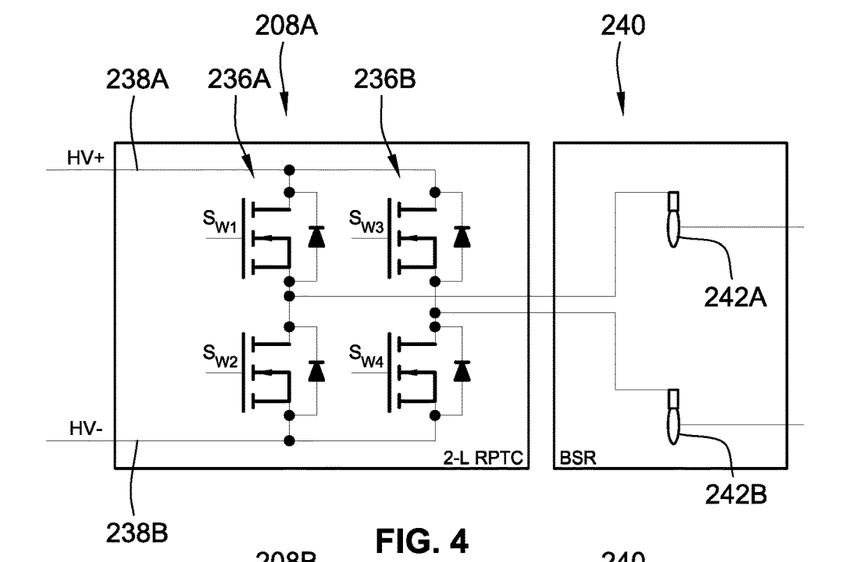
FIG. 4 is a schematic one-line diagram illustrating a representative 2-level rotor PTC with a brush slip ring assembly in accord with aspects of the present disclosure.
Figure 5:
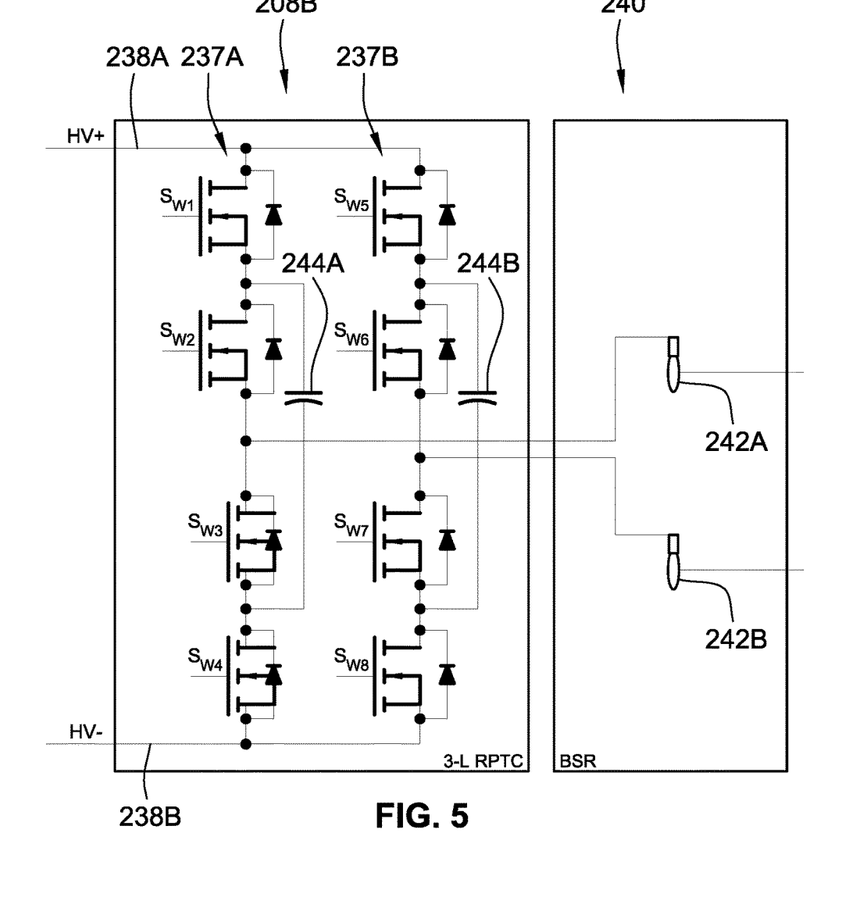
FIG. 5 is a schematic one-line diagram illustrating a representative 3-level rotor PTC with a brush slip ring assembly in accord with aspects of the present disclosure.

Disclosed rotator-excitation circuits may take on an assortment of different topologies, including 2+, 3+, . . . N+multilevel form factors as well as conductive, inductive, and capacitive configurations. FIGS. 4 and 5 respectively illustrate two non-limiting examples of PTC devices—a 2-level conductive rotor-excitation power transfer circuit (RPTC) 208A and a 3-level conductive RPTC 208B—that may be incorporated into the SEM drive systems 200, 300 of FIGS. 2 and 3. Each PTC device contains multiple sets of serially connected electromechanical or semiconductor switches (also referred to herein as "PTC switches") that cooperatively govern the flow of electrical power from the battery unit 202 to the SEM rotor assembly 218. In accord with the illustrated examples, the rotor-excitation PTC 208A of FIG. 4 contains four semiconductor switches $S_{W1}$-$S_{W4}$ that are arranged in two pairs 236A and 236B of serially connected solid-state switches. These two switch pairs 236A-236B may be electrically connected in parallel with each other via PTC transfer rails 238A and 238B. By way of comparison, the rotor-excitation PTC 208B of FIG. 5 contains eight semiconductor switches $S_{W1}$-$S_{W8}$ that are arranged in two sets 237A and 237B of serially connected solid-state switches. These two switch sets 237A-237B may be electrically connected in parallel with each other via the PTC transfer rails 238A, 238B. In both FIGS. 4 and 5, an input side of the RPTC 208A, 208B is electrically connected to the battery unit 202, whereas an output side of the he RPTC 208A, 208B is electrically connected to the SEM rotor assembly 218.

For conductive-type PTC configurations, a brush slip ring (BSR) assembly 240 may be interposed between and electrically connect the rotor-excitation PTC 208A, 208B and the rotor-borne armature winding 234 of the SEM unit 210. According to the illustrated examples of FIGS. 4 and 5, the BSR assembly 240 contains two discrete electromechanical BSR connectors 242A and 242B, each of which may be generally composed of one or more graphite/metal brushes contacting a rotating metal ring. A first of the BSR connectors 242A is electrically connected to the first pair/set of serially connected PTC switches 236A, 237A, whereas a second of the BSR connectors 242B is electrically connected to the second pair/set of serially connected PTC switches 236B. For the 3-Level RPTC 208B, a first block capacitor 244A is electrically connected to the first PTC switch set 237A and a second block capacitor 244B is electrically connected to the second PTC switch set 237B.

A separately excited motor unit 210 is interposed between the TIM 206 and PTC 208 and powered by the rechargeable battery assembly 202 to produce motor output torque, e.g., to rotate the drive wheels 12 of FIG. 1 and thereby propel the vehicle 10 or to perform work in a non-automotive SEM drive application. Unlike polyphase PM electric motors, which rely on rotor-borne permanent magnets, a synchronous wound-field SEM is generally typified by rotor-borne armature windings that electromagnetically mate with stator-borne field windings to convert electrical energy into mechanical energy. As shown, the SEM unit 210 contains a rotor assembly 218 that is coaxial with and rotatable with respect to a stator assembly 216. For radial-flux motor configurations, the stator assembly 216 includes an annular stator core 246 that carries multiple electromagnetic stator "field" windings 214A-214C. The rotor assembly 218, in contrast, includes a cylindrical rotor core 248 that carries one or more electromagnetic rotor "armature" windings 234. In this example, the rotor core 248 is rotatably mounted inside a hollow center of the stator core 246 such that the stator core assembly 216 circumscribes the rotor assembly 218.

The field and armature windings 214A-214C and 234 are energized with electrical power supplied by a battery assembly 202; once energized, the stator-borne field windings 214A-214C electromagnetically couple with and drive the rotor-borne armature winding 234 (the electromagnetic coupling represented schematically in FIGS. 2 and 3 by the S-shaped parallel lines connecting the stator assembly 216 and the rotor assembly 218). A motor output member, which may be in the nature of a rigid rotor shaft (not shown), may be splined, keyed, bolted, or otherwise fixedly attached to the rotor core 248 to rotate in unison therewith and output therefrom motor torque. Although not per se limited, the stator and rotor cores 246, 248 may be fabricated as laminate core constructions each composed of a stack of iron or other ferrous plates. Other components of SEM unit 210, such as a protective motor housing, motor end caps, bearings, seals, electrical terminals, etc., are present but not shown. While illustrated and described as a radial-flux electric machine, the SEM unit 210 may take on axial-flux and transverse-flux architectures within the scope of this disclosure.

Aspects of the present disclosure have been described in detail with reference to the illustrated embodiments; those skilled in the art will recognize, however, that many modifications may be made thereto without departing from the scope of the present disclosure. The present disclosure is not limited to the precise construction and compositions disclosed herein; any and all modifications, changes, and variations apparent from the foregoing descriptions are within the scope of the disclosure as defined by the appended claims. Moreover, the present concepts expressly include any and all combinations and subcombinations of the preceding elements and features.

What is claimed:

1. A motor drive system connectable to an electric power source, the motor drive system comprising:
a battery unit containing a rechargeable battery cell;
a multilevel power factor correction (PFC) device configured to electrically connect to the electric power source and interpose between the battery unit and the electric power source;
a traction inverter module (TIM) device electrically connected to the battery unit and the PFC device, the TIM device containing multiple pairs of TIM switches;
a multilevel power transfer circuit (PTC) device electrically connected to the battery unit and the PFC device, the PTC device containing multiple PTC switches; and
a separately excited motor (SEM) unit with a rotor assembly and a stator assembly, the rotor assembly including a rotor core bearing a rotor winding, and the stator assembly including a stator core bearing multiple stator windings that electromagnetically pair with the rotor winding, wherein each of the stator windings is electrically connected to a respective one of the pairs of TIM switches, and the rotor winding is electrically connected to the PTC switches.

2. The motor drive system of claim 1, wherein the TIM device is electrically interposed between the stator assembly of the SEM unit and either the battery unit or the PFC device.

3. The motor drive system of claim 1, wherein the PTC device is electrically interposed between the rotor assembly of the SEM unit and either the battery unit or the PFC device.

4. The motor drive system of claim 1, wherein the PTC switches include a first series of PTC switches electrically connected in parallel to a second series of PTC switches.

5. The motor drive system of claim 4, further comprising a brush slip ring (BSR) assembly interposed between and electrically connecting the PTC device and the rotor winding of the SEM unit, the BSR assembly including a first BSR electrically connected to the first series of PTC switches and a second BSR electrically connected to the second series of PTC switches.

6. The motor drive system of claim 5, wherein the PTC device further includes a first capacitor electrically connected to the first series of PTC switches and a second capacitor electrically connected to the second series of PTC switches.

7. The motor drive system of claim 6, wherein the first and second series of PTC switches each includes at least two PTC switches electrically connected in series to each other.

8. The motor drive system of claim 1, wherein the PFC device includes a first series of PFC switches electrically connected in parallel to a second series of PFC switches.

9. The motor drive system of claim 8, wherein the PFC device further includes a capacitor electrically connected in parallel to the first and second series of PFC switches.

10. The motor drive system of claim 9, wherein the first and second series of PFC switches each includes at least two PFC switches electrically connected in series to each other.

11. The motor drive system of claim 1, wherein the pairs of TIM switches include first, second, and third pairs of solid-state TIM switches, and wherein the stator windings include first, second, and third field windings each electrically connected in series with a respective one of the pairs or solid-state TIM switches.

12. The motor drive system of claim 1, wherein the battery unit includes a battery pack and/or multiple battery modules containing a plurality of rechargeable battery cells.

13. A motor vehicle comprising:
a vehicle body;
a plurality of road wheels attached to the vehicle body; and
a rechargeable energy storage system attached to the vehicle body and including a battery assembly containing multiple rechargeable battery cells;
a multilevel power factor correction (PFC) device electrically connected to the battery assembly and configured to electrically connect to an off-board electric power source and, once connected, interpose between the battery assembly and the electric power source;

a traction inverter module (TIM) device electrically connected to the battery assembly or the PFC device, the TIM device containing multiple pairs of TIM switches;

a multilevel rotor power transfer circuit (PTC) device electrically connected to the battery assembly, the TIM device, and the PFC device, the rotor PTC device containing multiple pairs of PTC switches; and a separately excited motor (SEM) unit attached to the vehicle body and operable to drive one or more of the road wheels to thereby propel the motor vehicle, the SEM unit including a rotor assembly and a stator assembly, the rotor assembly including a rotor core bearing an electromagnetic rotor winding, and the stator assembly including a stator core bearing multiple electromagnetic stator windings that electromagnetically pair with the rotor winding, wherein each of the stator windings is electrically connected to a respective one of the pairs of TIM switches, and the rotor winding is electrically connected to the PTC switches.

14. A method of manufacturing a motor drive system, the method comprising:

receiving a battery unit containing a rechargeable battery cell;

connecting a multilevel power factor correction (PFC) device to the battery unit, the PFC device being configured to electrically connect to the electric power source and interpose between the battery unit and the power source, the PFC device containing multiple PFC switches;

connecting a traction inverter module (TIM) device to the battery unit and the PFC device, the TIM device containing multiple pairs of TIM switches;

connecting a multilevel power transfer circuit (PTC) device to the battery unit and the PFC device, the PTC device containing multiple PTC switches;

receiving a separately excited motor (SEM) unit with a rotor assembly and a stator assembly, the rotor assembly including a rotor core bearing an electrically conductive rotor winding, and the stator assembly including a stator core bearing multiple electrically conductive stator windings that electromagnetically pair with the rotor winding;

connecting each of the stator windings to a respective one of the pairs of TIM switches; and connecting the rotor winding to the PTC switches.

15. The method of claim 14, wherein the TIM device is electrically interposed between the stator assembly of the SEM unit and either the battery unit or the PFC device.

16. The method of claim 14, wherein the PTC device is electrically interposed between the rotor assembly of the SEM unit and either the battery unit or the PFC device.

17. The method of claim 14, wherein the PTC switches include a first series of PTC switches electrically connected in parallel to a second set of PTC switches, and wherein the first and second series of PTC switches each includes at least two PTC switches electrically connected in series to each other.

18. The method of claim 17, further comprising connecting a brush slip ring (BSR) assembly to the PTC device and the rotor winding of the SEM unit such that the assembly is interposed between the PTC device and the rotor winding, the BSR assembly including a first BSR electrically connected to the first series of PTC switches and a second BSR electrically connected to the second series of PTC switches.

19. The method of claim 14, wherein the PFC device includes a first series of PFC switches electrically connected in parallel to a second set of PFC switches, and wherein the first and second series of PFC switches each includes at least two PFC switches electrically connected in series to each other.

20. The method of claim 19, wherein the PFC device further includes a capacitor electrically connected in parallel to the first and second series of PFC switches.

* * * * *